(12) United States Patent
Funk et al.

(10) Patent No.: US 8,308,411 B2
(45) Date of Patent: Nov. 13, 2012

(54) UNITARY VOID FILLING APPARATUS FOR USE WITH VARIOUS PALLET SIZES AND LOADS, AND METHOD OF USING THE SAME

(75) Inventors: Lori H. Funk, Folsom, CA (US); Patrick M. Henley, Rancho Cordova, CA (US)

(73) Assignee: Sunrise Mfg, Inc., Rancho Cordova, CA (US)

( * ) Notice: Subject to any disclaimer, the term of this patent is extended or adjusted under 35 U.S.C. 154(b) by 0 days.

(21) Appl. No.: 12/806,602

(22) Filed: Aug. 16, 2010

(65) Prior Publication Data

US 2010/0316463 A1 Dec. 16, 2010

Related U.S. Application Data

(63) Continuation of application No. 12/197,168, filed on Aug. 22, 2008, now Pat. No. 7,798,754.

(51) Int. Cl.
*B61D 45/00* (2006.01)
(52) U.S. Cl. ........................................ 410/154; 410/155
(58) Field of Classification Search .................. 410/155, 410/154, 96–99, 119–122, 39, 41; 160/351; 260/522, 523, 586, 591–593
See application file for complete search history.

(56) References Cited

U.S. PATENT DOCUMENTS

| | | | | | |
|---|---|---|---|---|---|
| 2,728,479 | A | * | 12/1955 | Wheeler | 217/35 |
| 3,405,659 | A | * | 10/1968 | Hees | 410/154 |
| 4,385,856 | A | * | 5/1983 | O'Neal | 410/34 |
| 4,585,381 | A | * | 4/1986 | Boyse | 410/154 |
| 5,175,041 | A | * | 12/1992 | Webb et al. | 428/116 |
| 5,540,972 | A | * | 7/1996 | Jaegers et al. | 428/116 |
| 5,678,968 | A | * | 10/1997 | Bourgeois et al. | 410/119 |
| 5,683,781 | A | * | 11/1997 | Komarek et al. | 428/116 |
| 6,527,488 | B2 | * | 3/2003 | Elze et al. | 410/119 |

* cited by examiner

*Primary Examiner* — Glenn Dayoan
*Assistant Examiner* — Sunsurraye Westbrook
(74) *Attorney, Agent, or Firm* — Audrey A. Millemann; Dennis A. DeBoo; Weintraub Tobin, et al.

(57) ABSTRACT

A unitary void filling apparatus for use as a lengthwise void spacer which is capable of preventing movement of a load disposed on a pallet, protecting the load from end-to-end forces, and acting as a dust cover. The apparatus consists of a frame folded to make a central area, which fits on top of the load, and two vertical sides, which hangs over opposite ends of the load. Attached to each vertical side are covered void fillers, each adapted to substantially fill any lengthwise underhang and protect the load from end-to-end forces. The central area of the frame supports the vertical sides to which the void fillers are attached, thereby holding the void fillers in the proper position and also preventing dust from accumulating on the cargo.

14 Claims, 1 Drawing Sheet

(Normal)

(Normal)

(Reverse)

US 8,308,411 B2

UNITARY VOID FILLING APPARATUS FOR USE WITH VARIOUS PALLET SIZES AND LOADS, AND METHOD OF USING THE SAME

CROSS-REFERENCE TO RELATED APPLICATION

This application is a continuation of prior U.S. application Ser. No. 12/197,168, filed on Aug. 22, 2008 now U.S. Pat. No. 7,798,754, and hereby incorporates that application in its entirety by reference, pursuant to 35 U.S.C. §120.

BACKGROUND

1. Field of the Invention

The inventions relates to the field of structural dunnage devices used to protect and fill voids within cargo enclosures and methods of using the same. More particularly, the inventions pertain to an apparatus and methods that fill voids created between loaded pallets in the lengthwise direction and protect the load from end-to-end forces while also functioning as a dust cover.

2. Description of the Related Art

Prior to the present invention various forms of space fillers or cargo protectors have been used. U.S. Pat. No. 7,137,765 B1 to Elze et al. and U.S. Pat. No. 6,527,488 B2 to Elze et al. are composite dunnage bags containing an inner air bladder surrounded by a supportive shell specifically designed for placement between two parallel rows of cargo, preferably of distances greater than twelve inches, which are used as lengthwise void fillers. U.S. Pat. No. 5,678,968 to Bourgeois et al. describes a honeycomb roll spacer and U.S. Pat. No. 5,741,098 to Letts III describes a wedge dunnage device, and these patents serve the purpose of protecting and supporting cylindrical cargo loads. As is apparent, however, none of these inventions are directed to stabilizing a load in which there exists underhang gaps, particularly within a row of same-sized pallets that contain loads with substantially similar underhangs.

A prior solution to filling voids created by the underhang of load on pallets is stuffing various dunnage;materials in between the load loaded on adjacent pallets. This solution is not effective, however, because the inserted material will not necessarily stay in the proper protective position, and also cannot be implemented efficiently, both during insertion and removal.

The invention described in U.S. Pat. Nos. 7,290,969 B2 and 7,066,698 B2 to Bullock utilize adhesive strips to hold cargo together. To effectively hold multiple units of cargo together, these inventions require the cargo to be in close proximity to each other and do not contemplate situations in which underhang space exists.

U.S. Pat. No. 5,152,647 to Sewell is directed to filling cross-wise voids and preventing overloading of axles on certain trailers.

SUMMARY

The present inventions relates to apparatus and methods of using structural dunnage devices used to protect and fill voids within cargo enclosures.

In one aspect the present invention provides a frame structure that fills voids created between loads loaded on pallets in the lengthwise direction and protects the loads from end-to-end forces while also functioning as a dust cover.

In other aspects, usage of the frame structures in different positional orientations to achieve different spacings to cover voids, as well as frame structures having void fillers attached thereto with thicknesses that are dependent on the number of frame structures used per loaded pallet are described.

BRIEF DESCRIPTION OF THE DRAWINGS

These and other aspects and features of the present inventions will become apparent to those of ordinary skill in the art upon review of the following description of specific embodiments of the invention in conjunction with the accompanying figures, wherein.

DETAILED DESCRIPTION OF THE PREFERRED EMBODIMENTS

Figure 1:
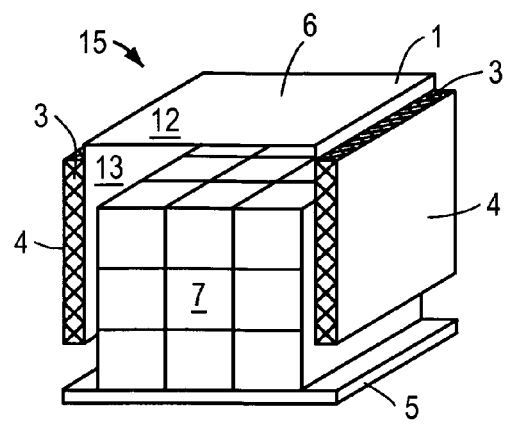
FIG. 1 is a perspective view of the apparatus over underhung cargo disposed on a pallet.
Figure 2:
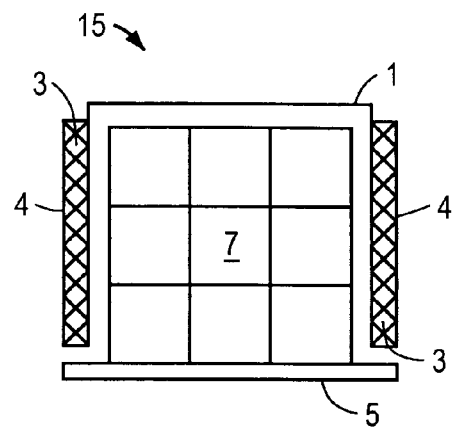
FIG. 2 is an end elevation view of the apparatus over underhung cargo disposed on a pallet.

FIG. 1 is a perspective view of the unitary void-filling apparatus 15 according to the present invention, in position over underhung load 7 disposed on a pallet 5, while FIG. 2 shows the same in elevation view. As shown, the unitary void-filling apparatus 15 includes a frame 1, preferably constructed from corrugated paperboard, in a manner well known in the art. Frame 1 is folded in two locations 10 to create a central area 12 and two, vertical sides 13 on opposite ends of the central area 12. Attached to the two vertical sides 13, typically using a glue line as known, are void fillers 3, and disposed over each of the void fillers 3, in a preferred embodiment, is an optional corrugated cover 4, all of which are explained in more detail below. It is noted that the void fillers 3 are positioned in a manner such that they do not interfere with the two locations 10 for the fold that creates the central area 12.

The frame 1 dimensions are variable and can be designed as necessitated so the central area 12 fits over the load 7 with the vertical sides 13 covering the height of the load 7, which can vary from load to load. Loads are carried on pallets, and pallets 5, as are known, come in a variety of different dimensions, with the most common dimensions in the United States being 48"×40" typically used for grocery items, 42"×42" typically used for electrical equipment, paint, and the like, as well as 48"×48", typically used for drums and other loads. Almost all pallets, however, have 36" as a smallest dimension and 56" as a largest dimension. The embodiments described herein can be mass-produced for specific usage with multiple loads of a specific size disposed on a known pallet size, as well as configured for use with different sized pallets and loads, so that the same void filling apparatus 15 can be used with a variety of different pallet sizes, as discussed further hereinafter.

The inner surface (of the two vertical sides 13 of the frame 1 or the void fillers 3, or the corrugated covers 4, depending on usage as discussed herein), when in place, encompasses the load 7. The central area 12 of the frame 1 acts to hold the sides 13, as well as the attached void fillers 3, as well as the corrugated covers 4 if used, in the proper position and also protect the load 7 from dust accumulation. The two vertical sides 13 preferably hang all the way down to the pallet, though it is within the scope of the invention if they hang only partially down over the load 7 being covered.

Attached to frame 1 on both vertical sides 13 are void fillers 3, which each attach, at a bottom surface of the void filler 3, to one of the vertical sides 13. The void fillers 3 cushion the lengthwise ends of the load 7 from end-to-end forces when the load 7 is positioned in the transport vehicle, as described further hereinafter. The void fillers 3 consist of various materials, as described herein. In one embodiment, uniform honeycomb cells are used with a cell size that can vary. A preferred cell size is one that is in the range of 3-5.5 inches$^2$ or greater, with a preferred cell size being 3.75 inches$^2$ that is capable of withstanding end-to-end impacts of 1500 lbs/ft$^2$. Alternately, the void fillers 3 could be comprised of smaller honeycomb cells (typically having cell sizes in the range of 0.5-1.5 inches$^2$, built-up corrugated paperboard, as well as other paper, kraft paper, or foam mediums, and the like. The thickness of the void filler 3 is variable, with a preferred thickness being at least ¾ of an inch for larger honeycomb cells, and ⅜ of an inch for smaller honeycomb cells, and extending to thicknesses of three inches, six inches, or more depending on the usage. The particular thickness depends on many factors, including the size of underhang created when the load 7 is placed on the pallet 5.

The apparatus 15 also includes, in a preferred embodiment, corrugated covers 4, attached to a top surface of both void fillers 3, respectively, on the opposite side of the frame 1, preferably constructed of corrugated paperboard.

Figure 3:
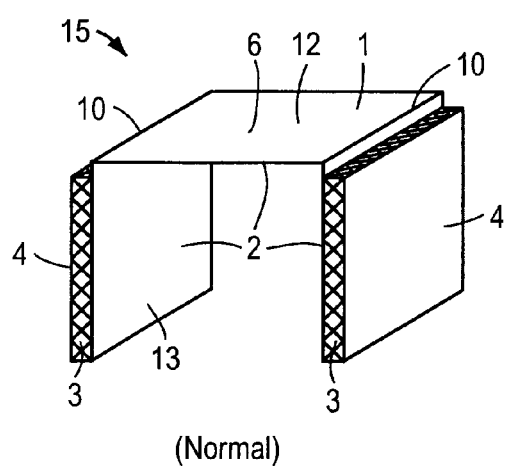
FIG. 3 is an end elevation view of the apparatus in original form.
Figure 4:
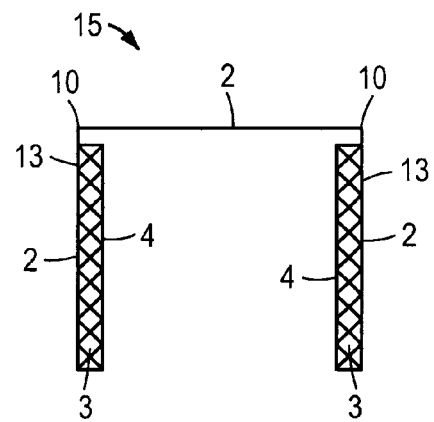
FIG. 4 is an end elevation view of the apparatus after being adjusted by reversing the frame.

FIG. 3 is an end elevation view of the void filling apparatus 15 in which the frame 1 forms the inner surface, whereas FIG. 4 is an end elevation view of the void filling apparatus 15 in which the frame 1 form the outer surface, obtained by reversing the frame, and which results in a narrower spacing for the inner surface (in this FIG. 4 embodiment then formed by the corrugated covers 4), as described herein. Specifically, reversing the frame 1 causes what had been the outer surface of the frame 1 to instead become the inner surface. Since the frame 1 is intended to have the vertical sides 13 hang vertically, reversing the frame to the FIG. 4 embodiment causes the corrugated cover 4 to become the inner surface, whereas the void fillers 3 are disposed inside the lengthwise dimension of the central area 12, rather than outside the lengthwise dimension of the central area 12 as in FIG. 3. This adjustment decreases the distance between the inner surface of the vertical sides by twice the thickness of one of the void fillers 3 and corrugated covers 4.

In use, a plurality of the void filling apparatuses 15 can each be placed over each of the loaded pallets, thereby creating covered loaded pallets, which can then be loaded onto a movable platform, such as a railway car or truck.

If the underhang of the loaded pallets is substantially similar for each of the loaded pallets, placing one of the void filling apparatuses over each loaded pallet will result in their being substantially no voids between adjacent loads in the longitudinal direction when placed in the movable platform. Thus, when loaded onto a movable platform, such as a railway car or truck, bumps from surfaces, starts and stops will not cause damage to the goods, as the longitudinal space between the loads is filled.

If the underhang is not substantially similar for the loaded pallets, the reversible feature of the void filling apparatuses 15 as discussed above can be used to eliminate to the greatest extent possible voids caused by the dissimilar underhangs.

In a modification of the above embodiments, the spacing of the void fillers 3 can be made to have a spacing of approximately double the underhang of the loaded pallets that each have a substantially similar underhand, such that only every other one of the loaded pallets have a void filling apparatus 15 disposed thereover, thus still resulting in the empty space between every adjacent pallet being filled.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

We claim:

1. A unitary void filling apparatus for preventing movement of a load disposed on a pallet, comprising:
   a frame having a horizontal top portion, a first substantially vertical portion, and a second substantially vertical portion, wherein said top portion has first and second opposing parallel edges, wherein each of said vertical portions has a top edge and a bottom edge, and wherein said first edge of said top portion and said top edge of said first vertical portion are integrally connected at a first fold, and wherein said second edge of said top portion and said top edge of said second vertical portion are integrally connected at a second fold;
   wherein each of said vertical portions has a first substantially vertical surface and a second substantially vertical surface;
   a first void filler attached to said first vertical surface of said first vertical portion;
   a second void filler attached to said first vertical surface of said second vertical portion; and
   wherein said first fold is devoid of said first void filler, said second fold is devoid of said second void filler, and said top portion is devoid of a void filler.

2. The unitary void filling apparatus of claim 1 wherein said first fold and said second fold are designed for use in either one of a first position and a second position, so that in said first position said first and second void fillers are disposed outside a lengthwise dimension of said horizontal top portion and, so that in said second position said first and second void fillers are disposed inside a lengthwise dimension of said horizontal top portion, and wherein a load space between said first and second substantially vertical portions decreases from said first position to said second position in dependence on a sum of a thickness of said first void filler and second void filler.

3. The unitary void filling apparatus of claim 1 wherein said first and second void fillers will withstand at least one of end-to-end and lateral compression forces.

4. The unitary void filling apparatus of claim 1 further comprising a first cover attached to an exterior surface of said first void filler and a second cover attached to an exterior surface of said second void filler and wherein said first void filler has an interior surface attached to said first substantially vertical surface of said first substantially vertical portion and said second void filler has an interior surface attached to said second substantially vertical surface of said second substantially vertical portion.

5. The unitary void filling apparatus of claim 1 wherein said first and second void fillers are comprised of a honeycomb cell structure.

6. A unitary void filling apparatus for preventing movement of a load disposed on a pallet, comprising:

a corrugated frame having a first fold interposed between a central area and a first substantially vertical side and a second fold interposed between said central area and a second substantially vertical side wherein said first and second substantially vertical sides each comprise a first substantially vertical surface opposed by a second substantially vertical surface and wherein said central area comprises a first substantially horizontal surface opposed by a second substantially horizontal surface;

a first void filler attached to said first substantially vertical surface of said first substantially vertical side at a location below said first fold wherein said first fold is devoid of said first void filler;

a second void filler attached to said first substantially vertical surface of said second substantially vertical side at a location below said second fold wherein said second fold is devoid of said second void filler; and wherein said first and second substantially horizontal surfaces of said central area are both devoid of a void filler.

7. The unitary void filling apparatus of claim 6 wherein said first fold and said second fold are designed for use in either one of a first position and a second position, so that in said first position said first and second void fillers are disposed outside a lengthwise dimension of said central area and, so that in said second position said first and second void fillers are disposed inside a lengthwise dimension of said central area, and wherein a load space between said first and second substantially vertical sides decreases from said first position to said second position in dependence on a sum of a thickness of said first void filler and second void filler.

8. The unitary void filling apparatus of claim 6 wherein said first and second void fillers will withstand at least one of end-to-end and lateral compression forces.

9. The unitary void filling apparatus of claim 6 further comprising a first cover attached to an exterior surface of said first void filler and a second cover attached to an exterior surface of said second void filler and wherein said first void filler has an interior surface attached to said first substantially vertical surface of said first substantially vertical side and said second void filler has an interior surface attached to said first substantially vertical surface of said second vertical side.

10. The unitary void filling apparatus of claim 6 wherein said first and second void fillers are comprised of a honeycomb cell structure.

11. A unitary void filling apparatus for preventing movement of a load disposed on a pallet, comprising:

a corrugated frame having a first fold interposed between a central area and a first substantially vertical side and a second fold interposed between said central area and a second substantially vertical side wherein said first and second substantially vertical sides each comprise a first substantially vertical surface opposed by a second substantially vertical surface and wherein said central area comprises a first substantially horizontal surface opposed by a second substantially horizontal surface;

a first void filler attached to said first substantially vertical surface of said first substantially vertical side at a location below said first fold wherein said first fold is devoid of said first void filler;

a second void filler attached to said first substantially vertical surface of said second substantially vertical side at a location below said second fold wherein said second fold is devoid of said second void filler;

wherein said first and second substantially horizontal surfaces of said central area are both devoid of a void filler; and wherein said first fold and said second fold are designed for use in either one of a first position and a second position, so that in said first position said first and second void fillers are disposed outside a lengthwise dimension of said central area and, so that in said second position said first and second void fillers are disposed inside a lengthwise dimension of said central area, and wherein a load space between said first and second substantially vertical sides decreases from said first position to said second position in dependence on a sum of a thickness of said first void filler and second void filler.

12. The unitary void filling apparatus of claim 11 wherein said first and second void fillers will withstand at least one of end-to-end and lateral compression forces.

13. The unitary void filling apparatus of claim 11 further comprising a first cover attached to an exterior surface of said first void filler and a second cover attached to an exterior surface of said second void filler and wherein said first void filler has an interior surface attached to said first substantially vertical surface of said first substantially vertical side and said second void filler has an interior surface attached to said first substantially vertical surface of said second vertical side.

14. The unitary void filling apparatus of claim 11 wherein said first and second void fillers are comprised of a honeycomb cell structure.

* * * * *